United States Patent [19]

Föhl

[11] Patent Number: 5,450,723
[45] Date of Patent: Sep. 19, 1995

[54] DRIVE UNIT FOR A BELT PRETENSIONER IN A SAFETY BELT SYSTEM FOR VEHICLES

[75] Inventor: Artur Föhl, Schorndorf, Germany

[73] Assignee: TRW Repa GmbH, Alfdorf, Germany

[21] Appl. No.: 206,598

[22] Filed: Mar. 3, 1994

[30] Foreign Application Priority Data

Mar. 6, 1993 [DE] Germany .............. 9303276 U

[51] Int. Cl.6 ............................................. F02N 13/00
[52] U.S. Cl. ..................... 60/638; 280/806; 297/480
[58] Field of Search ............ 60/632, 638; 297/480; 280/806

[56] References Cited

U.S. PATENT DOCUMENTS 4,573,322  3/1986  Fohl ........................................ 60/638
5,145,209  9/1992  Lenzen ................................ 60/632 X

FOREIGN PATENT DOCUMENTS 1458873 11/1966 France .
3727666  3/1989 Germany .
2129496  5/1984 United Kingdom .

Primary Examiner—Stephen F. Husar
Attorney, Agent, or Firm—Tarolli, Sundheim & Covell

[57] ABSTRACT

A belt pretensioner for vehicle safety belt systems is provided with a drive unit which comprises a pyrotechnic gas generator (12) and a piston and cylinder unit (16, 20). The piston (20) is arranged at a first end (161) of the cylinder (16) and is connected with a cable (22). By means of the gas pressure produced by the gas generator (12) the piston is accelerated towards the second, tapered end (162) of the cylinder (16). A sleeve-like insert (18) is arranged in the tapered cylinder end. The insert (18) has ribs and grooves alternating in the peripheral direction to offer sufficient room for plastic deformation.

8 Claims, 3 Drawing Sheets

DRIVE UNIT FOR A BELT PRETENSIONER IN A SAFETY BELT SYSTEM FOR VEHICLES

The present invention relates to a drive unit for a belt pretensioner for vehicle safety belt systems, comprising a pyrotechnic gas generator and a piston and cylinder unit, whose piston is arranged at a first end of the cylinder, and furthermore is connected with a cable and by means of the gas pressure produced by the gas generator is accelerated towards the second end of the cylinder.

In accordance with the prior art the end of the cylinder of a pyrotechnic linear drive remote from the gas generator may be constricted by having a conical taper. This part consequently functions as a piston catch device when the piston enters this end part, more particularly when the safety belt system is not being used or the cable should snap. In this case the piston accelerated by the action of the gas pressure from the gas generator is decelerated by deformation of this part of the cylinder. This prevents the piston being expelled from the cylinder. The cylinder and the piston as a rule consist of pressed aluminum.

In order to increase the protective action of safety belt systems pyrotechnic linear drives have recently been introduced for pretensioning the belt with a high power pyrotechnic device. The use of high power linear drives also means that the forces acting on the cylinder during deceleration are increased. More particularly on firing the gas generator connected with a safety belt system not in use the energy of the piston would be sufficient to splay out the conically tapered end part serving as a piston catch device with the result that the piston can shoot out of the cylinder.

One object of the invention is to improve a belt pretensioner of the type initially mentioned so that reliable deceleration of the piston is possible even in the case of a high power gas generator.

In connection with the features of the preamble of claim 1 herein this object is attained by a sleeve-like insert arranged in the tapered end portion of the cylinder, the insert having a non-circular cross section.

The invention is based on the notion that even in extreme cases such as that of an unused safety belt and a high power generator power a large quantity of kinetic energy of the piston may be completely absorbed at the end of the stroke if a large volume of material is available for plastic deformation. This volume may be made available if the outline of the insert departs from the circular. There are then free spaces, into which the plastically deformed material can be displaced. By suitably arranging the insert in the cylinder the retarding action on the piston may be simply obtained in a manner which is best for the manufacturing process and for the ultimate user without having to have a modification of design of the cylinder which is predetermined by the function to be performed.

The decelerating or retarding action may be optimized by the configuration of the insert. A systematically planned plastic deformation in line with the forces occurring is rendered possible if the outer and/or inner enveloping surface of the insert are made with a non-circular outline so that the systematic deformation will occur on impact of the piston into or, respectively, impact of the insert against the constriction of the cylinder. The non-circular form is accordingly designed in accordance with the maximum forces acting on the insert and for a reliable, controlled plastic deformation of the insert.

In accordance with a further advantageous development the non-circular form is embodied in ridges and/or grooves on the inner and/or the outer enveloping surface of the insert.

The retarding action of the insert on the piston may further be optimized by a suitable selection of the material without the strength properties of the cylinder being impaired. The fusion temperature of the material employed for the insert should be above the self-ignition temperature of the pyrotechnic gas generator. This may for instance be achieved by having a metallic, solder-like material such as a tin alloy. Then the retarding action of the insert on the piston is maintained, even if, for example in the case of fire in the vehicle, owing to the action of heat the generator is ignited and the piston strikes the insert without being retarded.

The retarding effect of the insert on the piston may be further optimized as well if the piston is designed in the form of a dart, whose cross section increases in size from the end pointing towards the insert to the other end thereof. It is convenient in this respect if the piston is made conical or frustoconical at least in parts thereof.

Further developments and advantages of the invention will be understood from the following description and from the drawing, which is referred to.

FIG. 3a to FIG. 5a are each a perspective view of one individual component in accordance with the invention.

FIG. 3b to FIG. 5b are each a cross sectional view taken through the design of the insert in accordance with FIGS. 3, 41 and, respectively, 5a.

Figure 1:
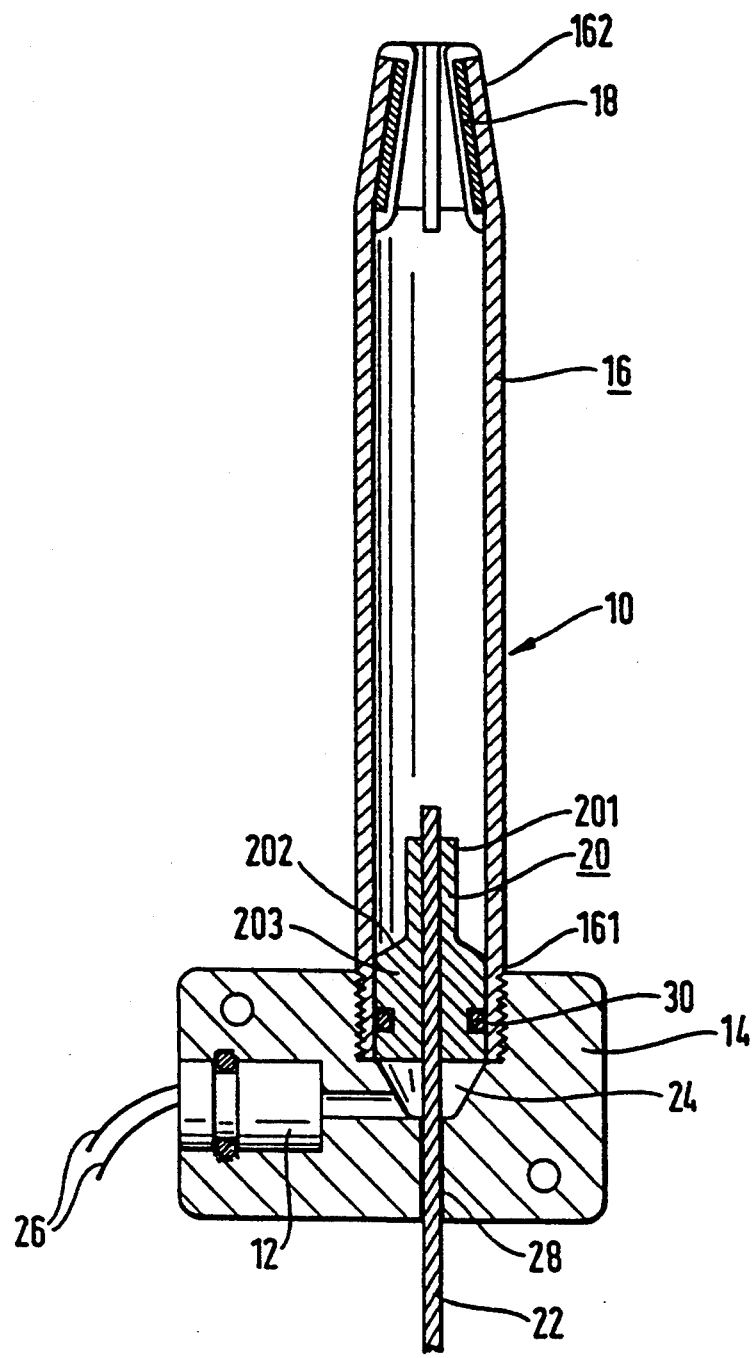
FIG. 1 is a longitudinal section taken through a pyrotechnic piston and cylinder linear drive of a belt pretensioner in accordance with a first working embodiment.

In FIG. 1 the reader will see a longitudinal sectional view of a piston and cylinder linear drive 10 of a belt pretensioner for vehicle safety belt systems. The piston and cylinder linear drive 10 comprises a gas generator 12, a housing block 14, wherein the gas generator 12 is arranged in a suitable recess, a cylinder 16, a sleeve-like insert, which functions as a piston retarding means 18, and a piston 20 which slides in the cylinder 16 and on which a cable 22 is attached.

The cylinder 16 is provided with a screw thread on a first end and is screwed into a corresponding screw threaded recess in the housing block 14. The piston 20 is arranged, in its neutral position, at a first end 161 of the cylinder 16. A pressure chamber 24 adjoins the piston 20 and it is connected with the receiving space of the electrically fired gas generator 12. For the electrical firing of the gas generator 12 there are two leads 26 connected with the firing means of the gas generator 12, which are connected a signal producing means, not illustrated here, which in turn can be operated by a sensor. However instead of an electrical firing device for the gas generator 12 it would be possible to have an other firing device such as a mechanical firing device.

The cable 22 is trained through the pressure chamber 24 and through a hole 28, which is essentially adapted to the cross section of the cable 22, in the housing block 14. For belt pretensioning in a conventional manner the cable 22 may be in engagement with a belt drum (not illustrated) or a buckle, not illustrated either.

Short of the second free end 162 of the cylinder 16 the cross section of the cylinder 16 decreases for a certain distance towards the second end 162 of the cylinder 16 so that the end part of the cylinder 16 is frustoconical in form. In this end part of the cylinder 16 the piston retarding means 18 is arranged. It has an enveloping surface which corresponds essentially to the inner enveloping surface of the cylinder 16. The piston retarding means 18 extends through the open frustoconical end 162 of the cylinder 16 and is bent round outwards. Consequently the piston retarding means 18 is secured in both axial directions. In a direction towards the first end 161 of the cylinder 16 the piston retarding means 18 is held because it extends in the above mentioned manner out of the open frustoconical end 162 of the cylinder 16 and is bent around. In the opposite direction the piston retarding means 18 is secured because the cylinder tapers conically and consequently functions as an abutment for the piston retarding means 18 when it is loaded. The cross sectional area of the cavity inside the piston retarding means 18 at the second end 162 of the cylinder 16 also becomes smaller towards the second end 162 of the cylinder.

The piston retarding means 18 consists of a metallic solder-like material in such as a tin alloy. The fusion point of the material is above the self-igniting temperature of the gas generator 12 so that the retarding effect of the piston retarding means 18 on the piston 20 is maintained should heat be developed and the gas generator fired thereby, just as in the case of a fire in the vehicle.

The piston 20 is firmly crimped on the cable 22 and has a seal 30 so that the gas pressure produced for the belt pretensioning operation may act more or less free of loss on the piston 20. At its front end the piston 20 has a sleeve-shaped swaged neck 201. The sleeve-like neck 201 is connected by means of a conical part 202 with the rest of the piston part 203. Owing to this design of the piston 20 engagement thereof with the piston retarding means is enhanced and a strong join with the cable 22 by crimping is facilitated too. The piston 20 is designed as a dart or penetrating body. When the piston's cylindrical, sleeve-like neck 201, its conical intermediate part 202 and the rest 203 of it strike the piston retarding means 18 the latter is so strongly plastically deformed that it takes on the opposite configuration of the piston sections 201 and 202. The piston retarding means 18 is then—as already mentioned above—held by the constriction of the cylinder 16.

Figure 2:
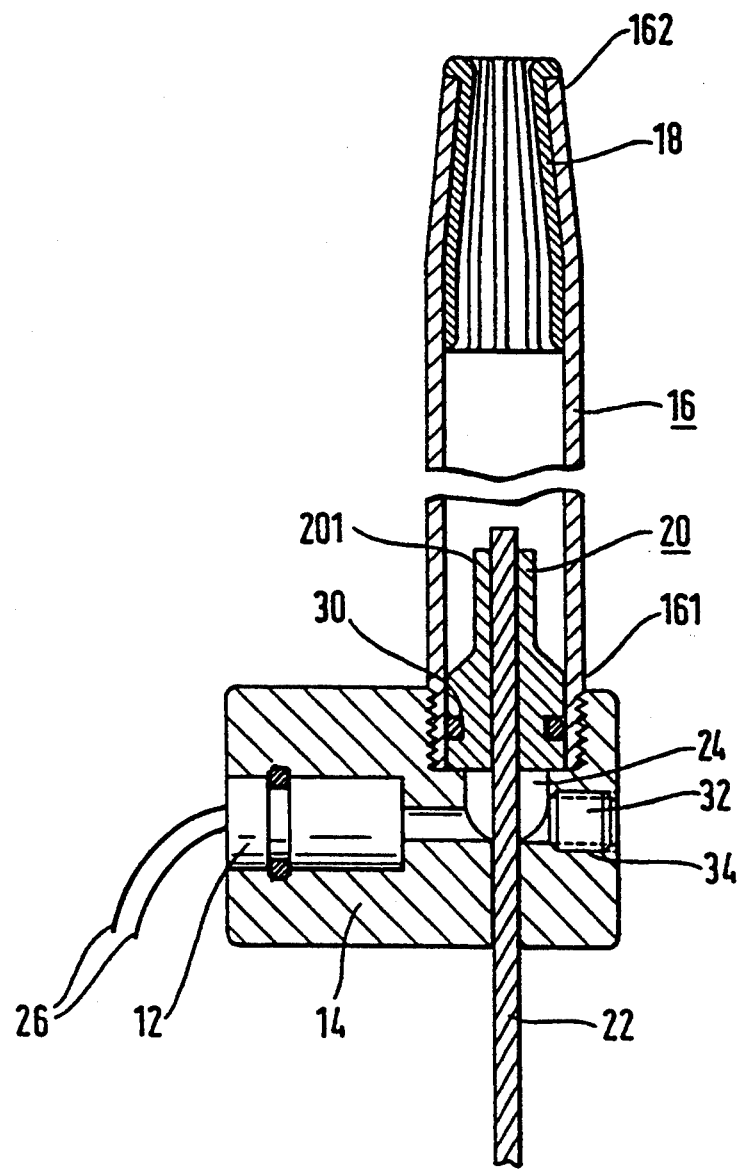
FIG. 2 is a longitudinal section taken through a pyrotechnic piston and cylinder linear drive of a belt pretensioner in accordance with a second working embodiment.

FIG. 2 shows a further working embodiment of the invention.

This design is substantially the same as the working embodiment in accordance with FIG. 1. It only differs in that a plug 32 is arranged in a hole 34. The plug 32 consists of a material, whose fusion point is above the operating temperature of the gas generator 12 and at the most is equal to the self-ignition temperature of the gas generator. The plug 32 becomes soft under the action of heat, as for instance in case of fire and on firing of the gas generator 12 clears the hole 34 so that no dangerously high gas pressures may occur in the pressure chamber.

Furthermore the piston retarding means 18 of this design is so elongated to be longer than the design of FIG. 1 that the piston retarding means 18 extends past the frustoconical part of the cylinder 16 towards the first end 161 of the cylinder 16.

Figure 3A:
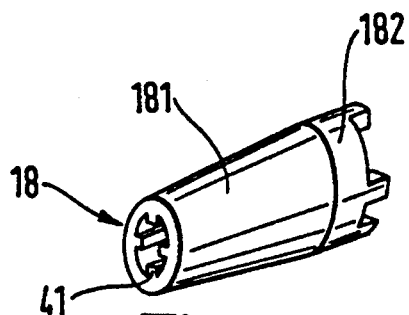
Figure 3B:
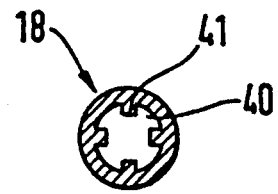
Figure 4A:
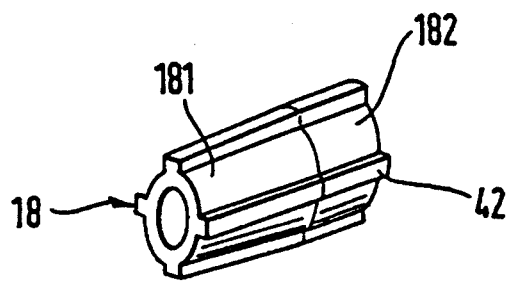
Figure 4B:
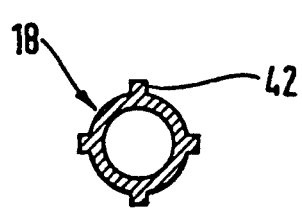
Figure 5A:
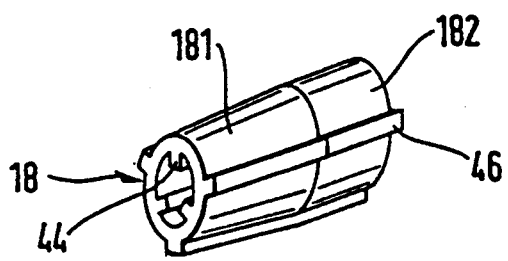
Figure 5B:
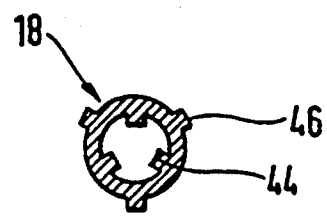

Further designs of the piston retarding means 18 are illustrated in FIGS. 3a through 5b. In this respect the FIGS. 3a, 4a and 5a respectively show a perspective view of one working embodiment of the piston retarding means 18 whereas FIGS. 3b, 4b and 5b show the corresponding cross sections of the working embodiments of FIGS. 3a, 4a and 5a, respectively. The piston retarding means 18 in accordance with FIGS. 3a through 5a has a conical part 181 and an adjoining cylindrical part 182. These parts are adapted to the inner enveloping surface of the cylinder 16 at its second end 162. All such working embodiments of the piston retarding means 18 come to an end with the cylinder 16 at its second end 162. For axially locating and preventing movement towards the first end 161 of the cylinder 16 the piston retarding means 18 is respectively fixed to the cylinder 16.

The working embodiment in accordance with FIGS. 3a and 3b has grooves 40 and ridges 41 on the inner enveloping surface of the piston retarding means 18, which extend right through the piston retarding means and are at an angle to the axial direction.

The working embodiment in accordance with FIGS. 4a and 4b has ridges 42 on the outer enveloping surface which are as well inclined in relation to the axial direction.

The further working embodiment in accordance with FIGS. 5a and 5b has ridges 44 on the inner enveloping surface and on the outer enveloping surface it has ridges 46. The ridges 44 and 46 also extend at an angle to the axial direction.

The number and the size and furthermore the configuration of the ridges 41, 42, 44 and 46 and of the grooves 40 may be varied in accordance with the power of the gas generator and consequently the forces to be expected when the piston 16 strikes the piston retarding means 18.

Figure 6:
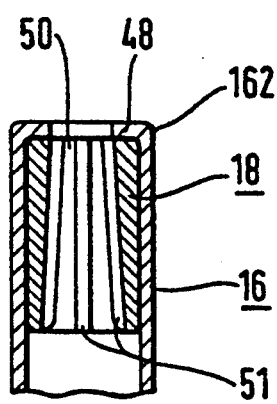
FIG. 6 is a cross sectional view of part of a cylinder with a insert in accordance with a further working embodiment of the invention.

FIG. 6 represents a section of part of a further working embodiment of a piston retarding means 18 in a cylinder 16. The cylinder 16 in this case does not have any frustoconical second end 162 but rather a constant cross section along its axial extent. At the second end 162 the cylinder wall is only bent inwards perpendicularly so that there is also an abutment 48 for axially locating the piston retarding means 18. Accordingly, the outer enveloping surface of the piston retarding means 18 is adapted to the enveloping surface of the cylinder 16. As in the other working embodiments the inner enveloping surface of the retarding means 18 tapers towards the second end 162 of the cylinder 16 conically. However in this working embodiment there is only the provision of machined grooves 50 and of ridges 51 on the inner enveloping surface of the piston retarding means 18. Accordingly the outer enveloping surface on the other hand has no projecting structures and/or recesses. The piston retarding means 18 may be fixed in position by crimping or bonding in the cylinder.

The non-circular form of the inner and/or outer enveloping surface of the piston retarding means has an effect on the plastic deformation of the piston retarding means 18 so that the retarding effect occurring with the penetrating impact of the piston 20 may be simply set and a reliable retarding of the piston 20 is ensured even in the case of a high power of the gas generator. It will be clear that the piston retarding means 18 does not have to be arranged in the end part of the cylinder 16, and may rather more be provided at any position between the constriction of the cylinder 16 and the piston 20. In this case the piston retarding means 18 would be entrained as far as the end 162 of the cylinder 16. Here the retarding of the piston 20 and the deformation of the piston retarding means 18 would take place.

As will be seen from the above described working embodiments it is possible for the retarding action of the piston retarding means 18 to be set optimally independently of the functionally determined design features of the cylinder 16 by the geometry and the selection of materials sa as to be truly in line with requirements.

What is claimed is:

1. A drive unit for a safety belt pretensioner, comprising a cylinder, a piston slidingly received in said cylinder, a cable connected to said piston and a pyrotechnic gas generator, said cylinder having a tapered end wherein an insert sleeve is accommodated, said insert sleeve having a non-circular cross section.

2. The drive unit of claim 1, wherein said insert sleeve is of a material which has a fusion temperature above a self-ignition temperature of a pyrotechnic substance in said gas generator.

3. The drive unit of claim 2, wherein said insert sleeve is of a metallic alloy.

4. The drive unit of claim 1, wherein said piston has a reduced cross section on its side facing said insert sleeve.

5. The drive unit of claim 1, wherein said piston is tapered on its side facing said insert sleeve.

6. The drive unit of claim 1, wherein said insert sleeve has an inner surface provided with ridges and grooves alternating in a peripheral direction.

7. The drive unit of claim 1, wherein said insert sleeve has an outer surface provided with ridges and grooves alternating in a peripheral direction.

8. The drive unit of claim 1, wherein said insert sleeve has an outer surface adapted to the inner surface of said tapered cylinder end.

* * * * *